United States Patent

[11] 3,542,076

[72] Inventor William D. Richardson
 Palos Heights, Illinois
[21] Appl. No. 713,243
[22] Filed March 14, 1968
[45] Patented Nov. 24, 1970
[73] Assignee Tuthill Pump Company
 a corporation of Delaware

[54] TUBE TESTER CONNECTOR
 10 Claims, 3 Drawing Figs.
[52] U.S. Cl. ................................................ 138/89,
 72/58, 285/338, 285/382.5
[51] Int. Cl. ........................................................ F16l 55/10,
 F16l 55/12
[50] Field of Search ............................................ 138/89, 90,
 91, 92, 94, 94.3, 95; 29/Inq. 523; 220/Inq;
 285/Inq, 382.4, 382.5, 338; 72/Inq, 58

[56] References Cited
 UNITED STATES PATENTS
 743,400 3/1903 Sherman ..................... 29/523
 2,405,399 8/1946 Bugg et al. ................. 29/523
 2,937,666 5/1960 Maisch ........................ 138/89
 3,044,496 7/1962 Maisch ........................ 138/89
 3,323,551 6/1967 Bell et al. ................... 138/90

Primary Examiner—Houston S. Bell, Jr.
Attorney—Mann, Brown, McWilliams & Bradway ABSTRACT: A tube tester connector for sealing the open end of thin wall deformable tubing which employs as the primary retaining and anchoring means a split ring or similar type expanding device, which, upon actuation, forms an internal groove in the interior wall of the thin wall tubing. The bead thereby formed provides a satisfactory anchoring means and a sealing member, such as an O-ring, provides the seal so that the tubing may be tested. In one embodiment the device is provided with a pipe port through which a fluid may be introduced into the tubing to be tested.

Patented Nov. 24, 1970
3,542,076
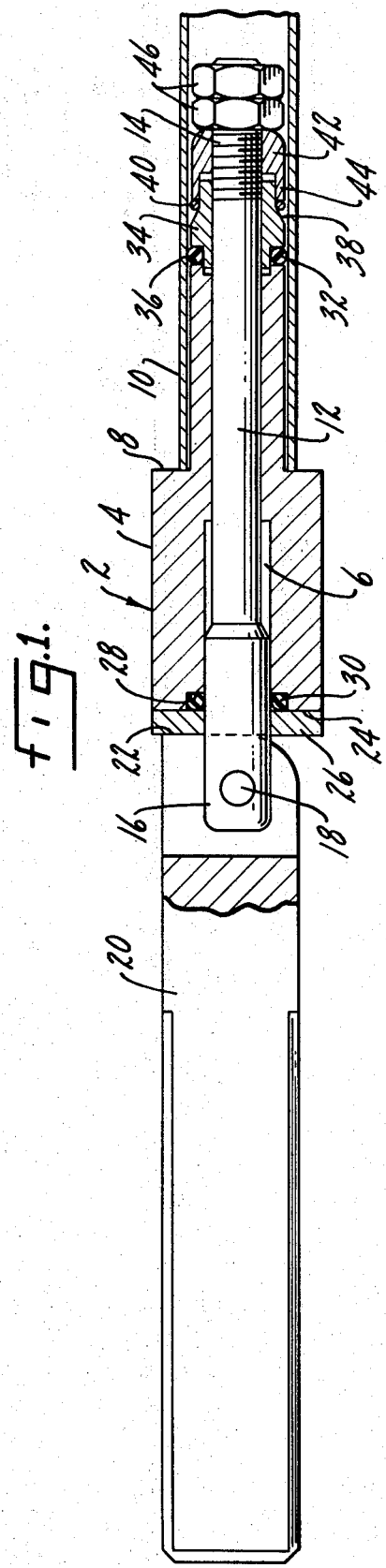
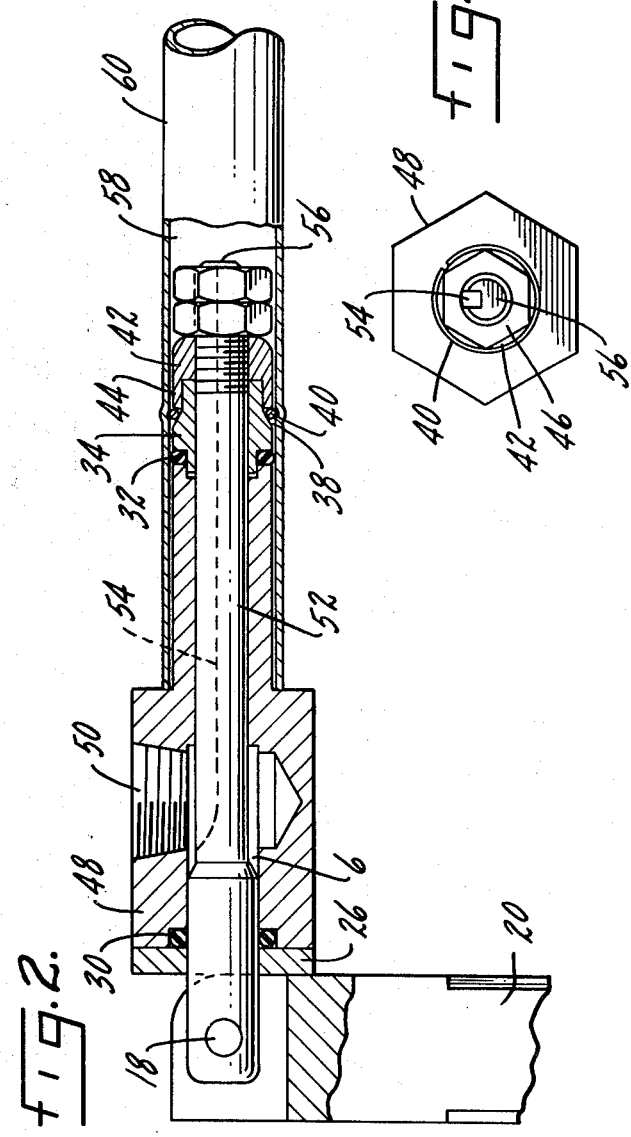
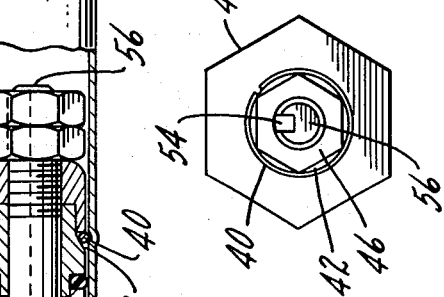
INVENTOR.
William D. Richardson,
BY Mann, Brown & McWilliams
Attorneys.

3,542,076

TUBE TESTER CONNECTOR

BACKGROUND OF THE INVENTION

Generally speaking, the tube testing devices of this invention relate to tube seals for temporarily sealing the ends of tubes and conduits for testing, filling, or like purposes. The herein disclosed devices have numerous advantages over such prior art devices as illustrated in Maisch 2,937,666 and 3,044,496. Internal tube seals of the character wherein sealing action is obtained by engagement of the internal surfaces of the tube, like those illustrated in the aforesaid patents, have generally been relatively complicated and expensive in character. In many instances the expanding means do not provide a good enough seal in order to carry out a satisfactory test of the tubing. This is especially true where high pressures are to be employed in testing the tubing.

SUMMARY OF THE INVENTION

Generally, the aforedescribed shortcomings and deficiencies are overcome by providing a tube connecter which forms an internal groove within the tubing which is to be tested. Generally, and in order to utilize the devices of this invention, the tubing contemplated should be thin-walled and somewhat malleable or deformable to permit the device to form an internal groove by which primary anchoring of the device is obtained and through which it is almost impossible to displace the tube connecter from the sealing position, unless desired. Generally, the devices of this invention comprise a connecter for insertion into and the sealing of open ended thin-walled, deformable tubing wherein a body member having an axial bore is provided with a terminal portion adapted to be inserted into the open end of a tube. A stem is shiftably disposed in the bore in fluid-tight relationship with the end of the body member opposite the terminal portion and a handle means is secured to the stem in order to position it into one of two positions. The normal or disengaging position and the locked or engaging position is dictated by movement of the handle. Means are provided on the stem adjacent the terminal portion of the body member for forming an internal groove in the tubing while at the same time sealing it in fluid-tight relationship when the stem is positioned in the tube engaging position.

BRIEF DESCRIPTION OF THE DRAWINGS

FIG. 1 is a longitudinal view showing the tube seal embodying the features of the invention in the normal or disengaging position;

FIG. 2 is a longitudinal view of another embodiment of the invention showing the tube seal in the tube engaging and sealing position; and FIG. 3 is a partial end view of the device pictured in FIG. 2.

DESCRIPTION OF THE PREFERRED EMBODIMENTS

Referring to the drawings, wherein like numerals of reference designate like elements throughout the several views, and specifically to FIG. 1, the tube sealer 2 is shown with a body portion 4 having an axial bore 6 extending throughout its entire length. Shoulder portions 8 of body member 4 provide an abutment surface when the tube sealer is inserted into thin-walled, deformable tubing 10. The bore 6 has disposed therein shiftable stem 12 in close tolerance relation except for the major portion of the enlarged section of body member 4, the reason for which will be apparent. Stem 12 has threaded end 14 enlarged end 16 which projects beyond body member 4 through which is disposed pin 18 by which handle 20 is secured to the stem. Between the end surface 22 of handle 20 and the end shoulder 24 of body member 4, there is provided a cam washer 26 to provide a camming surface for handle 20 when it is pivoted through an arc of 90° as will hereinafter become apparent.

End surface 24 of body member 4 has counterbore 28 in which is disposed a sealing member such as O-ring 30 so as to seal bore 6 adjacent enlarged stem portion 16 in fluid-tight relationship. Threaded stem end 14 has slidably disposed thereon, a sealing means 32, actuator rig ring 34 and spacer member 42. Sealing means 32, such as an O-ring, abuts end 36 while actuator ring 34 is in spaced relationship in the normal position from the end 36 of body member 4. It will be noted that actuator ring 34 has an inclined surface as at 38 on which is disposed split ring member 40. A spacer member 42 is disposed on the stem end 14, having protruding end walls 44 and being in spaced relationship with actuator ring 34, provides the means whereby the split ring 40 is urged up the incline 38 into anchoring or locking position. Two lock nuts 46 are threadably secured to stem end 14 so as to retain actuator ring 34, split ring member 40 and spacer member 42 in the relative position shown in FIG. 1.

Referring to the remaining FIGS. it is quite clear that when the handle 20 is rotated about the pivot point defined by the pin 18, the stem 12 is shiftably moved to the left as viewed in FIG. 2 thereby moving actuator ring 34 to the left, causing the compression of O-ring 32 and forcing same into sealing engagement with the internal wall of the tubing. At the same time, the spacer member 42 is also being urged to the left as viewed in FIG. 1 and the projecting portion 44 acts upon the split ring 40 to drive it up the sloping wall or incline 38 of actuator ring 34. This causes the ring 40 to engage the internal wall of the deformable tubing to form an internal groove and an external bead to anchor the test tube connecter securely in place within the tubing.

The tubing is now ready to be tested and a test fluid may be introduced at the opposite end, or when it is desired that the test fluid be introduced via the test connecter device, a longitudinal groove is provided in the stem to communicate with a pipe port opening in the body of the test connecter which in turn may be connected to a fluid supply source. Referring specifically to FIG. 2, in this embodiment body member 48 is provided with a threaded pipe port opening 50 which communicates with the interior bore or chamber 6. The stem 52 is provided with longitudinal groove, channelway or slot 54 substantially from a point immediately below the pipe port opening 50 to the end thereof 56. The operation of both devices is the same and the only difference is that the device of FIG. 2 allows for the introduction of a fluid through the test tube connecter by means of the orifice 50 and channelway 54, which as is readily apparent, communicates to the interior of the tubing 58 of tube 60.

It will thus be seen that one merely need slip the device as shown in FIG. 1 into the tube to be tested with the handle 20 in the unlocked or open position. Once in position, the handle 20 is rotated through an arc of 90° to a locked position as shown in FIG. 2 which causes O-ring sealing and the formation of an internal groove which satisfactorily anchors the test tube connecter in place within the hollow, deformable tubing. To withdraw the device the opposite sequence of steps is followed and because of the resiliency of the O-rings and the spring memory of the split ring 40, the split ring 40 retreats down the slope 38 to assume the position shown in FIG. 1. The device may then be removed from the tubing without difficulty.

There, of course, are other modifications that will not depart from the spirit and scope of the invention and which will make themselves apparent to those skilled in the art and it is intended that all be covered by the appended claims to the extent allowable by the prior art.

I claim:

1. A connecter for insertion into and the sealing of open ended, thin wall, deformable tubing comprising:
 a. a body member having an axial bore and a terminal portion adapted to be inserted into the open end of a tube;
 b. a stem shiftably disposed in said bore in fluid-tight relationship with the end of said body member opposite said terminal portion;
 c. handle means secured to said stem to position it in one of two positions; and
 d. means including a one-piece groove forming member carried on said stem adjacent said terminal portion of said body member for forming a continuous, anchoring internal groove of relatively finite size compared to said member in a major portion of the interior periphery of said tubing and for sealing same in fluid-tight relationship when said stem is positioned in said one of two positions.

2. The connecter in accordance with claim 1 wherein said stem adjacent said terminal portion of said body member has a threaded end which carries an actuator ring member which, upon axial displacement, causes a split ring member to expand and form said groove.

3. The connecter in accordance with claim 2 wherein said stem adjacent said terminal portion of said body member carries a sealing means which, upon said axial displacement is compressed and urged into fluid-tight relationship with said tubing.

4. The connecter in accordance with claim 2 wherein said stem adjacent said terminal portion of said body member carries an actuator ring having a smaller diameter end supporting said split ring member and having sloping sides on which said ring member is pushed and a sealing member is disposed between said actuator ring and the terminal portion of said body member.

5. The connecter in accordance with claim 4 wherein said spacer member, upon actuation of said handle, forces said split ring up said sloping surface to thereby form said internal groove in said tubing and urges said actuator ring into engagement with said sealing means to thereby form an effective fluid-tight seal for the open end of said tubing.

6. The connecter in accordance with claim 5 wherein said threaded stem end is provided with lock nuts to retain said spacer and actuator ring on said stem and said handle means is pivotally secured to said stem.

7. The connecter in accordance with claim 6 wherein said body member has an enlarged diameter portion opposite said terminal portion to provide shoulders at which the end of said open tube may abut.

8. The connecter in accordance with claim 7 wherein a camming surface washer is provided between said body member and the engaging surface of said handle and a sealing O-ring is provided to form a fluid-tight seal between said body member, cam washer and stem.

9. The connecter in accordance with claim 8 wherein said stem has an axial bore in a portion thereof extending from the approximate center of the enlarged section of said body member to the end of said stem extending into said tubing.

10. The connecter in accordance with claim 9 wherein said body member has a pipe port opening communicating the stem bore to the outside of said body member for connection to a fluid supply connecter.